US010066613B2

(12) United States Patent
Asayama et al.

(10) Patent No.: US 10,066,613 B2
(45) Date of Patent: Sep. 4, 2018

(54) FUEL PUMP

(71) Applicant: TOYOTA JIDOSHA KABUSHIKI KAISHA, Toyota-shi, Aichi-ken (JP)

(72) Inventors: Kazuhiro Asayama, Nagoya (JP); Hirokazu Yokoyama, Toyota (JP); Satoki Takagi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 212 days.

(21) Appl. No.: 15/275,917

(22) Filed: Sep. 26, 2016

(65) Prior Publication Data
US 2017/0096988 A1    Apr. 6, 2017

(30) Foreign Application Priority Data

Oct. 1, 2015   (JP) ................................ 2015-195888

(51) Int. Cl.
*F04B 17/04*      (2006.01)
*F04B 17/03*      (2006.01)
(Continued)

(52) U.S. Cl.
CPC ........... *F04B 17/03* (2013.01); *F02M 59/025* (2013.01); *F02M 59/10* (2013.01); *F04B 15/00* (2013.01);
(Continued)

(58) Field of Classification Search
CPC ...... F04B 9/06; F04B 53/001; F04B 11/0075; F04B 17/03; F04B 19/22; F04B 1/02;
(Continued)

(56) References Cited

U.S. PATENT DOCUMENTS 3,286,911 A * 11/1966 Clarke .................. F04B 25/005
                                              417/254
4,154,559 A *  5/1979 Enomoto ............... F04B 45/043
                                              417/413.1
(Continued)

FOREIGN PATENT DOCUMENTS

JP    S48-035406 A    5/1973
JP    S49-89906 A     8/1974
(Continued)

OTHER PUBLICATIONS

Sep. 13, 2017 Decision to Grant issued in Japanese Patent Application No. 2015-195888.
(Continued)

*Primary Examiner* — Devon Kramer
*Assistant Examiner* — David Brandt
(74) *Attorney, Agent, or Firm* — Oliff PLC (57) ABSTRACT

A fuel pump includes a plunger that reciprocates in a cylinder. The fuel pump further includes a first mover connected to the plunger, a second mover serving as a counterweight for the first mover, an electromagnet provided between the first mover and the second mover, a first magnetic member provided between the first mover and the second mover, and a first spring urging the first mover and the second mover away from each other. Further, a second magnetic member is provided between both of the electromagnet and the first magnetic member and a first inclined surface of the first mover, while a third magnetic member is provided between both of the electromagnet and the first magnetic member and a second inclined surface of the second mover.

2 Claims, 7 Drawing Sheets

(51) Int. Cl.
  *F02M 59/02* (2006.01)
  *F02M 59/10* (2006.01)
  *F04B 15/00* (2006.01)
  *F04B 19/22* (2006.01)
  *F04B 53/14* (2006.01)
  *F04B 53/16* (2006.01)
  *H02K 33/12* (2006.01)
  *H02K 33/06* (2006.01)
  *H02K 33/16* (2006.01)

(52) U.S. Cl.
  CPC ............ *F04B 17/042* (2013.01); *F04B 19/22* (2013.01); *F04B 53/14* (2013.01); *F04B 53/16* (2013.01); *H02K 33/06* (2013.01); *H02K 33/12* (2013.01); *H02K 33/16* (2013.01)

(58) Field of Classification Search
  CPC .............. F04B 11/0033; F04B 11/0083; F04B 25/005; F04B 27/005; F04B 49/12; F04B 19/20; F04B 23/04; F04B 23/06; F04B 17/04; F04B 17/042; F04B 17/044; F04B 35/04; F04B 35/045; F04B 43/02; F04B 45/04; F04B 45/047; F04B 11/00; F04B 53/14; F04B 53/16; F04B 15/00; F02M 37/08; F02M 37/043; F02M 37/04; F02M 59/025; F02M 59/10; H02K 33/16; H02K 33/06; H02K 33/12
  See application file for complete search history.

(56) References Cited

U.S. PATENT DOCUMENTS

| | | | | |
|---|---|---|---|---|
| 5,907,201 A * | 5/1999 | Hiterer | ................. | F02G 1/0435 310/15 |
| 5,944,302 A * | 8/1999 | Loc | ...................... | F04B 35/045 267/180 |
| 6,290,308 B1 | 9/2001 | Zitzelsberger | | |
| 8,447,148 B1 * | 5/2013 | Garcia | ................. | G02B 6/3504 385/16 |
| 2006/0110259 A1 | 5/2006 | Puff et al. | | |
| 2008/0245097 A1* | 10/2008 | Cho | ....................... | F04B 25/00 62/510 |
| 2010/0209053 A1* | 8/2010 | Moriarty | ............... | G02B 6/3809 385/81 |
| 2011/0286868 A1* | 11/2011 | Sardet | .................. | F04B 17/046 417/417 |
| 2014/0161650 A1* | 6/2014 | Paweletz | ................. | F04B 17/03 417/415 |
| 2015/0098849 A1* | 4/2015 | Bagagli | .................... | F04B 5/02 417/488 |
| 2015/0260172 A1 | 9/2015 | Ishikawa et al. | | |

FOREIGN PATENT DOCUMENTS

| | | |
|---|---|---|
| JP | S50-030306 U | 4/1975 |
| JP | S52-035604 U | 3/1977 |
| JP | S54-127609 U | 9/1979 |
| JP | S56-045161 U | 4/1981 |
| JP | S59-043686 U | 3/1984 |
| JP | H02-37260 U | 3/1990 |
| JP | H02-040973 U | 3/1990 |
| JP | H11-506185 A | 6/1999 |
| JP | 2000-008996 A | 1/2000 |
| JP | 2000-170646 A | 6/2000 |
| JP | 2000-297751 A | 10/2000 |
| JP | 2012-163106 A | 8/2012 |
| JP | 2014-117149 A | 6/2014 |
| WO | 97-30288 A2 | 8/1997 |
| WO | 2014/069455 A1 | 5/2014 |

OTHER PUBLICATIONS

U.S. Appl. No. 15/260,978, filed Sep. 9, 2016, by Kazuhiro Asayama.

* cited by examiner

FUEL PUMP

INCORPORATION BY REFERENCE

The disclosure of Japanese Patent Application No. 2015-195888 filed on Oct. 1, 2015 including the specification, drawings and abstract is incorporated herein by reference in its entirety.

BACKGROUND

1. Field of the Embodiment

The embodiment relates to a fuel pump.

2. Description of Related Art

There is known a fuel pump that pressurizes fuel in a pressurizing chamber, defined by a cylinder and a plunger, by the movement of the plunger in the cylinder. As a drive mechanism for reciprocating such a plunger, a device described, for example, in Japanese Patent Application Publication No. 2014-117149 (JP 2014-117149 A) includes a mover that is reciprocated by an electromagnet, wherein a piston that serves as a plunger is connected to the mover.

SUMMARY

The magnetic permeability of air is very small compared to a magnetic substance such as iron. Therefore, in the state where the electromagnet and the mover are spaced apart from each other such that an air gap is formed therebetween, since the air is present between the electromagnet and the mover, a value of magnetic flux density obtained by multiplication between the strength of a magnetic field generated by the electromagnet and the magnetic permeability of air becomes small so that a magnetic force that acts on the mover is weakened. Therefore, it is necessary to supply more electric power to the electromagnet in anticipation of a reduction in magnetic force due to the air gap, resulting in a possibility that the electric power efficiency is degraded.

The embodiment provides a fuel pump that can suppress degradation of electric power efficiency due to an air gap.

A fuel pump according to an aspect of the embodiment includes a pump portion including a cylinder, a plunger configured to reciprocate in the cylinder, and a pressurizing chamber defined by the cylinder and the plunger, the pump portion configured to pressurize fuel in the pressurizing chamber by moving the plunger in the cylinder. The fuel pump further includes a first mover including a first inclined surface extending obliquely in a radial direction of the plunger, the first mover connected to the plunger; a second mover provided to face the first mover in an axial direction of the plunger, the second mover including a second inclined surface extending obliquely in the radial direction of the plunger, the second mover configured to serve as a counterweight for suppressing vibration that occurs due to reciprocating movement of the first mover; a housing including therein the first mover and the second mover; an electromagnet provided between the first inclined surface and the second inclined surface; a first magnetic member provided between the first inclined surface and the second inclined surface, the first magnetic member provided next to the electromagnet in the radial direction of the plunger and fixed to the housing; a first spring urging the first mover and the second mover such that the first mover and the second mover are spaced away from each other; a second magnetic member provided between both of the electromagnet and the first magnetic member and the first inclined surface, the second magnetic member including a third inclined surface having an inclination angle equal to an inclination angle of the first inclined surface and configured to contact the first inclined surface, the second magnetic member configured to move in the radial direction of the plunger in a state of being in contact with the electromagnet and the first magnetic member; a second spring urging the second magnetic member such that the first inclined surface and the third inclined surface maintain a state of being in contact with each other; a third magnetic member provided between both of the electromagnet and the first magnetic member and the second inclined surface, the third magnetic member including a fourth inclined surface having an inclination angle equal to an inclination angle of the second inclined surface and configured to contact the second inclined surface, the third magnetic member configured to move in the radial direction of the plunger in a state of being in contact with the electromagnet and the first magnetic member; and a third spring urging the third magnetic member such that the second inclined surface and the fourth inclined surface maintain a state of being in contact with each other.

According to the configuration described above, when the electromagnet is energized, since the first mover having the first inclined surface and the second mover having the second inclined surface are attracted to the electromagnet and the first magnetic member, the first mover and the second mover move toward each other. When the energization of the electromagnet is stopped, the first mover and the second mover move away from each other by an urging force of the first spring. Therefore, by repeating the energization and the energization stop of the electromagnet, the plunger connected to the first mover reciprocates, while the second mover serving as a counterweight for the first mover moves synchronously in a direction opposite to a moving direction of the first mover. Therefore, vibration that occurs due to the reciprocating movement of the first mover is canceled by vibration that occurs due to the reciprocating movement of the second mover.

Herein, in the configuration described above, since the second magnetic member is provided between the first inclined surface of the first mover and both of the electromagnet and the first magnetic member, when the electromagnet is energized, the second magnetic member is magnetized so that the first inclined surface of the first mover is attracted to the third inclined surface of the magnetized second magnetic member. When the first inclined surface of the first mover and the third inclined surface of the second magnetic member are in the state of being in contact with each other by a magnetic force in this way, in the case where the first inclined surface moves in a direction toward the electromagnet and the first magnetic member, the second magnetic member moves in the radial direction of the plunger due to a component force applied to the third inclined surface. In this way, when the first inclined surface moves in the direction toward the electromagnet and the first magnetic member, the second magnetic member maintains a state of being attracted to the first inclined surface of the first mover, the electromagnet, and the first magnetic member while moving in the radial direction of the plunger. Therefore, the formation of an air gap between the first mover and the electromagnet and the formation of an air gap between the first mover and the first magnetic member are suppressed during the energization of the electromagnet.

When the energization of the electromagnet is stopped, the first inclined surface of the first mover moves in a direction away from the electromagnet and the first magnetic member by an urging force of the first spring. In this event, by an urging force of the second spring, the second magnetic member moves in the radial direction of the plunger while the first inclined surface of the first mover and the third inclined surface of the second magnetic member maintain a state of being in contact with each other. In this way, even in the case where the first inclined surface moves in the direction away from the electromagnet and the first magnetic member, the second magnetic member maintains a state of being in contact with the first inclined surface of the first mover, the electromagnet, and the first magnetic member while moving in the radial direction of the plunger. Therefore, the formation of an air gap between the first mover and the electromagnet and the formation of an air gap between the first mover and the first magnetic member are suppressed when starting the energization of the electromagnet again.

Likewise, in the configuration described above, since the third magnetic member is provided between the second inclined surface of the second mover and both of the electromagnet and the first magnetic member, when the electromagnet is energized, the third magnetic member is magnetized so that the second inclined surface of the second mover is attracted to the fourth inclined surface of the magnetized third magnetic member. When the second inclined surface of the second mover and the fourth inclined surface of the third magnetic member are in the state of being in contact with each other by a magnetic force in this way, in the case where the second inclined surface moves in a direction toward the electromagnet and the first magnetic member, the third magnetic member moves in the radial direction of the plunger due to a component force applied to the fourth inclined surface. In this way, when the second inclined surface moves in the direction toward the electromagnet and the first magnetic member, the third magnetic member maintains a state of being attracted to the second inclined surface of the second mover, the electromagnet, and the first magnetic member while moving in the radial direction of the plunger. Therefore, the formation of an air gap between the second mover and the electromagnet and the formation of an air gap between the second mover and the first magnetic member are suppressed during the energization of the electromagnet.

When the energization of the electromagnet is stopped, the second inclined surface of the second mover moves in a direction away from the electromagnet and the first magnetic member by an urging force of the first spring. In this event, by an urging force of the third spring, the third magnetic member moves in the radial direction of the plunger while the second inclined surface of the second mover and the fourth inclined surface of the third magnetic member maintain a state of being in contact with each other. In this way, even in the case where the second inclined surface moves in the direction away from the electromagnet and the first magnetic member, the third magnetic member maintains a state of being in contact with the second inclined surface of the second mover, the electromagnet, and the first magnetic member while moving in the radial direction of the plunger. Therefore, the formation of an air gap between the second mover and the electromagnet and the formation of an air gap between the second mover and the first magnetic member are suppressed when starting the energization of the electromagnet again.

In this way, according to the configuration described above, by providing the second magnetic member and the third magnetic member, it is possible to suppress degradation of electric power efficiency due to an air gap. In the fuel pump, the second magnetic member and the third magnetic member may each include a first magnetic portion configured to constantly maintain a state of being in contact with the electromagnet when moving in the radial direction of the plunger, a second magnetic portion configured to constantly maintain a state of being in contact with the first magnetic member when moving in the radial direction of the plunger, and a non-magnetic portion disposed between the first magnetic portion and the second magnetic portion.

According to the configuration described above, part of a magnetic circuit that attracts the inclined surfaces of the movers (i.e. the first inclined surface and the second inclined surface) is formed by the first magnetic portions and the second magnetic portions. Herein, when the second magnetic member and the third magnetic member move in the radial direction of the plunger, the first magnetic portions are constantly in contact with the electromagnet, while the second magnetic portions are constantly in contact with the first magnetic member. Accordingly, even when the second magnetic member and the third magnetic member move in the radial direction of the plunger, the magnetic circuit that attracts the inclined surfaces of the movers can maintain a connected state without disconnection. Therefore, it is possible to maintain, for example, a state in which a strong magnetic force is applied to the inclined surfaces of the movers.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinbelow, an embodiment of a fuel pump will be described in detail with reference to FIGS. 1 to 7. A fuel pump 50 of this embodiment is configured as a high-pressure fuel pump that is disposed in an in-cylinder injection type engine for a vehicle.

Figure 1:
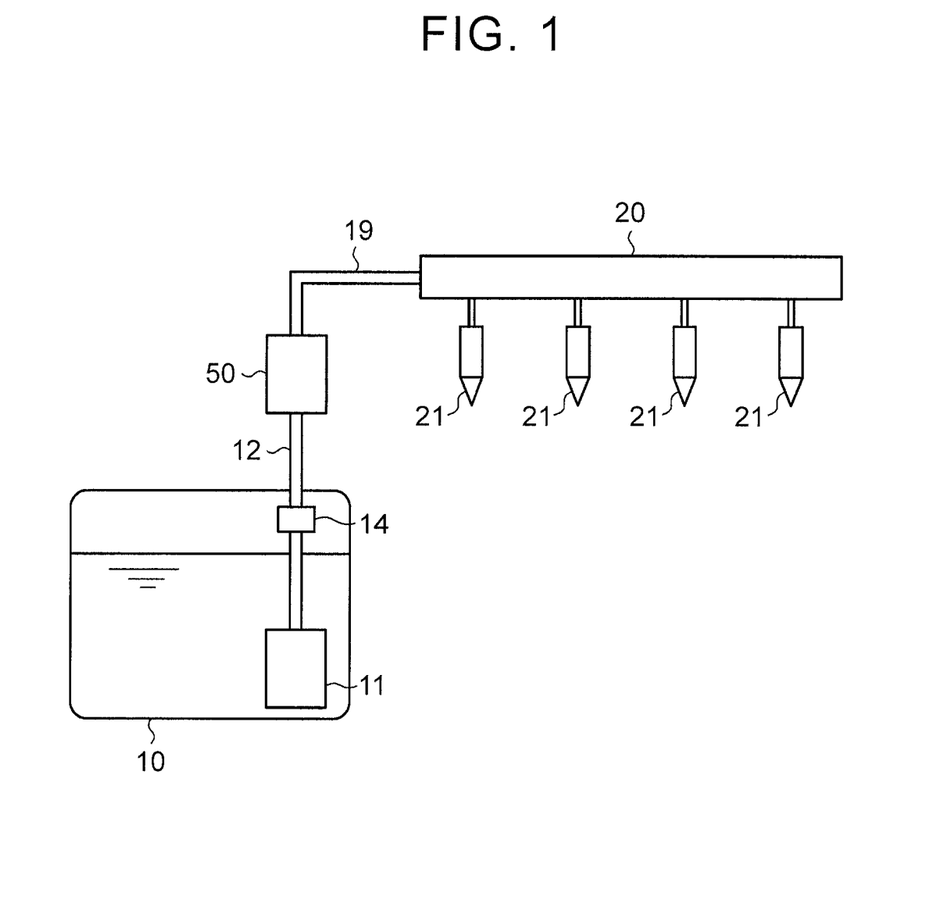
FIG. 1 is a schematic diagram exemplarily showing a configuration of a fuel system of an engine in which a fuel pump of an embodiment is disposed.

As shown in FIG. 1, a feed pump 11 that pumps out fuel is disposed in a fuel tank 10 of the in-cylinder injection type engine. The feed pump 11 is connected to the fuel pump 50 via a low-pressure fuel passage 12. The low-pressure fuel passage 12 is provided with a regulator 14 that discharges the fuel in the low-pressure fuel passage 12 to the fuel tank 10 when the fuel pressure in the low-pressure fuel passage 12 exceeds a prescribed value.

The fuel pump 50 is disposed, for example, near the fuel tank 10 and connected to a delivery pipe 20 via a high-pressure fuel passage 19. Injectors 21 disposed in respective cylinders of the in-cylinder injection type engine are connected to the delivery pipe 20.

Figure 2:
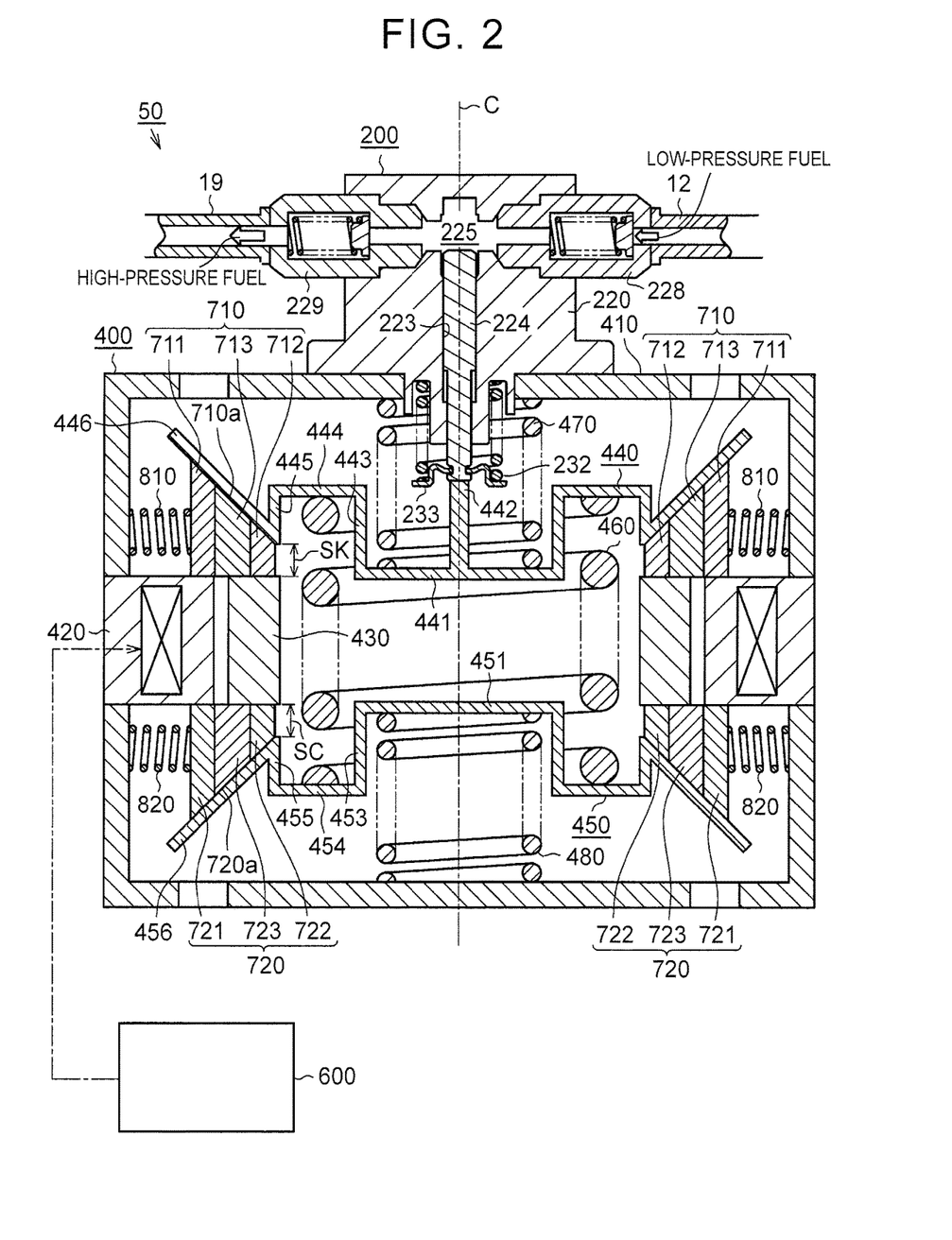
FIG. 2 is a sectional view of the fuel pump of the embodiment.

As shown in FIG. 2, the fuel pump 50 includes a pump portion 200 that discharges high-pressure fuel, and a drive portion 400 that drives the pump portion 200. The pump portion 200 includes a pump body 220 formed therein with a tubular cylinder 223. A plunger 224 in the form of a round bar is reciprocatingly disposed in the cylinder 223. The plunger 224 is disposed in a state where one end thereof is inserted inside the cylinder 223, while the other end thereof protrudes to the outside of the cylinder 223. The inside of the cylinder 223 is comparted by the plunger 224 such that a pressurizing chamber 225 for pressurizing the fuel is formed in the cylinder 223.

The pump body 220 is provided with a first check valve 228 that allows the low-pressure fuel delivered through the low-pressure fuel passage 12 to flow into the pressurizing chamber 225 and that blocks the fuel flow from the pressurizing chamber 225 into the low-pressure fuel passage 12.

The pump body 220 is further provided with a second check valve 229 that allows the high-pressure fuel pressurized in the pressurizing chamber 225 to flow into the high-pressure fuel passage 19 and that blocks the fuel flow from the high-pressure fuel passage 19 into the pressurizing chamber 225.

An annular spring seat 233 is attached to an end portion, protruding to the outside of the cylinder 223, of the plunger 224. A spring 232 is disposed between the spring seat 233 and the pump body 220 so as to urge the plunger 224 in a direction away from the pressurizing chamber 225.

The drive portion 400 includes a hollow cylindrical housing 410. The pump portion 200 is attached to an outer peripheral surface of the housing 410 in such a way that the end portion, provided with the spring seat 233, of the plunger 224 is exposed to the inside of the housing 410.

A first mover 440 is disposed in the housing 410. The first mover 440 is generally disk-shaped and made of a soft magnetic material. A first planar portion 441 of a disk shape is formed at a central portion of the first mover 440 so as to extend parallel to a radial direction of the first mover 440, and a rod-shaped connecting portion 442 that is connected to the end portion of the plunger 224 extends from a central portion of the first planar portion 441.

A first wall portion 443 of a hollow cylindrical shape is formed on the outer periphery of the first planar portion 441 so as to extend in a direction in which the pump portion 200 is disposed, and a second planar portion 444 of an annular shape is formed at a distal end of the first wall portion 443 so as to extend parallel to the radial direction of the first mover 440.

A second wall portion 445 of a hollow cylindrical shape is formed on the outer periphery of the second planar portion 444 so as to extend in a direction opposite to the direction in which the pump portion 200 is disposed, and a first inclined surface 446 of an annular shape is formed at a distal end of the second wall portion 445 so as to extend obliquely in a radial direction of the plunger 224 (the direction perpendicular to a central axis C of the plunger 224).

Further, a second mover 450 is disposed in the housing 410. The second mover 450 is disposed so as to face the first mover 440 in an axial direction of the plunger 224 (the extending direction of the central axis C of the plunger 224).

The second mover 450 is generally disk-shaped and made of a soft magnetic material. A third planar portion 451 of a disk shape is formed at a central portion of the second mover 450 so as to extend parallel to a radial direction of the second mover 450.

A third wall portion 453 of a hollow cylindrical shape is formed on the outer periphery of the third planar portion 451 so as to extend in a direction opposite to the direction in which the pump portion 200 is disposed, and a fourth planar portion 454 of an annular shape is formed at a distal end of the third wall portion 453 so as to extend parallel to the radial direction of the second mover 450.

A fourth wall portion 455 of a hollow cylindrical shape is formed on the outer periphery of the fourth planar portion 454 so as to extend in the direction in which the pump portion 200 is disposed, and a second inclined surface 456 of an annular shape is formed at a distal end of the fourth wall portion 455 so as to extend obliquely in the radial direction of the plunger 224 (the direction perpendicular to the central axis C of the plunger 224). The inclination angle of the second inclined surface 456 is equal to that of the first inclined surface 446.

The second mover 450 is provided so as to serve as a counterweight for suppressing vibration that occurs due to the reciprocating movement of the first mover 440. The thicknesses, the sizes, and so on of the first mover 440 and the second mover 450 are set such that the mass of the first mover 440 and the mass of the second mover 450 are substantially equal to each other. In order to make the mass of the first mover 440 and the mass of the second mover 450 equal to each other as much as possible, the first mover 440 or the second mover 450 may be formed with a mass-adjusting hole or added with a mass-adjusting weight. In the case where the mass of the plunger 224 is large enough not to be ignorable compared to the mass of the first mover 440, it is desirable that the mass of the second mover 450 and the sum of the mass of the first mover 440 and the mass of the plunger 224 be made approximately equal to each other.

An electromagnet 420 is disposed between the first inclined surface 446 of the first mover 440 and the second inclined surface 456 of the second mover 450. The electromagnet 420 is disposed annularly along a circumferential direction of the housing 410.

The inclination direction of the first inclined surface 446 is set such that the first inclined surface 446 is spaced away from the electromagnet 420 as approaching the outer periphery of the first inclined surface 446. Likewise, the inclination direction of the second inclined surface 456 is set such that the second inclined surface 456 is spaced away from the electromagnet 420 as approaching the outer periphery of the second inclined surface 456.

A first magnetic member 430 of a ring shape fixed to the housing 410 is disposed between the first inclined surface 446 of the first mover 440 and the second inclined surface 456 of the second mover 450. The first magnetic member 430 is disposed next to the electromagnet 420 on the inner peripheral side of the electromagnet 420 in the radial direction of the plunger 224 and is made of a soft magnetic material such as iron.

A first spring 460 is disposed between the second planar portion 444 of the first mover 440 and the fourth planar portion 454 of the second mover 450 so as to urge the first mover 440 and the second mover 450 away from each other.

A spring 470 is disposed between the first planar portion 441 of the first mover 440 and an inner wall, facing the first planar portion 441, of the housing 410 so as to urge the first mover 440 in a direction toward the first magnetic member 430.

Further, a spring 480 is disposed between the third planar portion 451 of the second mover 450 and an inner wall, facing the third planar portion 451, of the housing 410 so as to urge the second mover 450 in a direction toward the first magnetic member 430.

The free lengths, the spring constants, and the preloads, when attached to the drive portion 400, of the spring 470 and the spring 480 are set to be the same as each other. The spring constants of the spring 470 and the spring 480 are set to be sufficiently smaller than that of the first spring 460, thereby preventing the spacing between the first mover 440 and the second mover 450 achieved by the first spring 460 from being hindered by the urging forces of the spring 470 and the spring 480.

It is assumed that the distance between the first mover 440 and the electromagnet 420, or more precisely, the shortest distance in the axial direction of the plunger 224 between the first inclined surface 446 of the first mover 440 and the electromagnet 420, is a distance SK. Likewise, it is assumed that the distance between the second mover 450 and the electromagnet 420, or more precisely, the shortest distance in the axial direction of the plunger 224 between the second inclined surface 456 of the second mover 450 and the electromagnet 420, is a distance SC. While the distance SK and the distance SC change due to the movement of the first mover 440 and the second mover 450, the shapes, the disposing positions, and so on of the first mover 440 and the second mover 450 are set such that the distance SK and the distance SC become equal to each other in a state where the first mover 440 and the second mover 450 are spaced apart from each other to the maximum by the urging force of the first spring 460.

Between both of the electromagnet 420 and the first magnetic member 430 and the first inclined surface 446, second magnetic members 710 that move in the radial direction of the plunger 224 are disposed in a state of being in contact with the electromagnet 420 and the first magnetic member 430.

The second magnetic member 710 is provided with a third inclined surface 710a that has an inclination angle equal to that of the first inclined surface 446 and that contacts the first inclined surface 446. The second magnetic member 710 includes a first magnetic portion 711 that constantly maintains a state of being in contact with the electromagnet 420 when the second magnetic member 710 moves in the radial direction of the plunger 224, and a second magnetic portion 712 that constantly maintains a state of being in contact with the first magnetic member 430 when the second magnetic member 710 moves in the radial direction of the plunger 224. The first magnetic portion 711 and the second magnetic portion 712 are made of a soft magnetic material such as iron. Further, a non-magnetic portion 713 made of a non-magnetic material such as an aluminum alloy is disposed between the first magnetic portion 711 and the second magnetic portion 712. By disposing the non-magnetic portion 713 between the first magnetic portion 711 and the second magnetic portion 712 in this way, the first magnetic portion 711 and the second magnetic portion 712 serve as passages for magnetic flux to flow through in the second magnetic member 710.

A second spring 810 is disposed between the second magnetic member 710 and an inner wall, facing the second magnetic member 710, of the housing 410 so as to urge the second magnetic member 710 such that the first inclined surface 446 and the third inclined surface 710a maintain a state of being in contact with each other. By the second spring 810, the second magnetic member 710 is urged in a direction toward the central axis C in the radial direction of the plunger 224.

Figure 3:
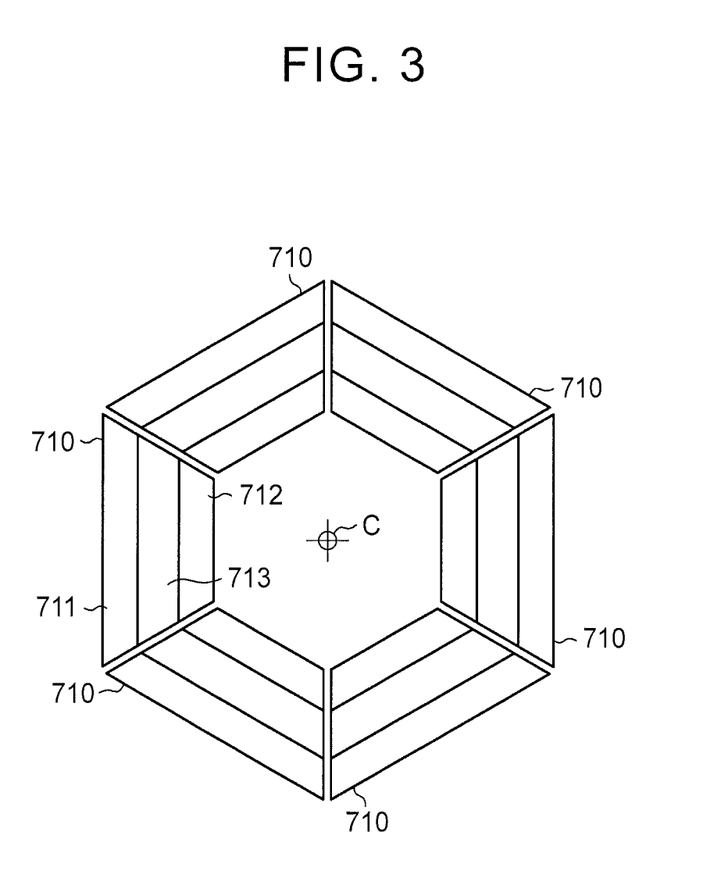
FIG. 3 is a plan view showing an arrangement of second magnetic members.

As shown in FIG. 3, the six second magnetic members 710 are equiangularly disposed around the central axis C of the plunger 224. The number of the second magnetic members 710 to be disposed can be changed as appropriate.

Between both of the electromagnet 420 and the first magnetic member 430 and the second inclined surface 456, third magnetic members 720 that move in the radial direction of the plunger 224 are disposed in a state of being in contact with the electromagnet 420 and the first magnetic member 430. The third magnetic member 720 has the same shape as the second magnetic member 710.

That is, the third magnetic member 720 is provided with a fourth inclined surface 720a that has an inclination angle equal to that of the second inclined surface 456 (i.e. equal to that of the first inclined surface 446) and that contacts the second inclined surface 456.

Further, the third magnetic member 720 includes a first magnetic portion 721 that constantly maintains a state of being in contact with the electromagnet 420 when the third magnetic member 720 moves in the radial direction of the plunger 224, and a second magnetic portion 722 that constantly maintains a state of being in contact with the first magnetic member 430 when the third magnetic member 720 moves in the radial direction of the plunger 224. The first magnetic portion 721 and the second magnetic portion 722 are made of a soft magnetic material such as iron. Further, a non-magnetic portion 723 made of a non-magnetic material such as an aluminum alloy is disposed between the first magnetic portion 721 and the second magnetic portion 722. By disposing the non-magnetic portion 723 between the first magnetic portion 721 and the second magnetic portion 722 in this way, the first magnetic portion 721 and the second magnetic portion 722 serve as passages for magnetic flux to flow through in the third magnetic member 720.

A third spring 820 is disposed between the third magnetic member 720 and an inner wall, facing the third magnetic member 720, of the housing 410 so as to urge the third magnetic member 720 such that the second inclined surface 456 and the fourth inclined surface 720a maintain a state of being in contact with each other. By the third spring 820, the third magnetic member 720 is urged in a direction toward the central axis C in the radial direction of the plunger 224.

Like the second magnetic members 710, the six third magnetic members 720 are equiangularly disposed around the central axis C of the plunger 224. The number of the third magnetic members 720 to be disposed can also be changed as appropriate.

Figure 4:
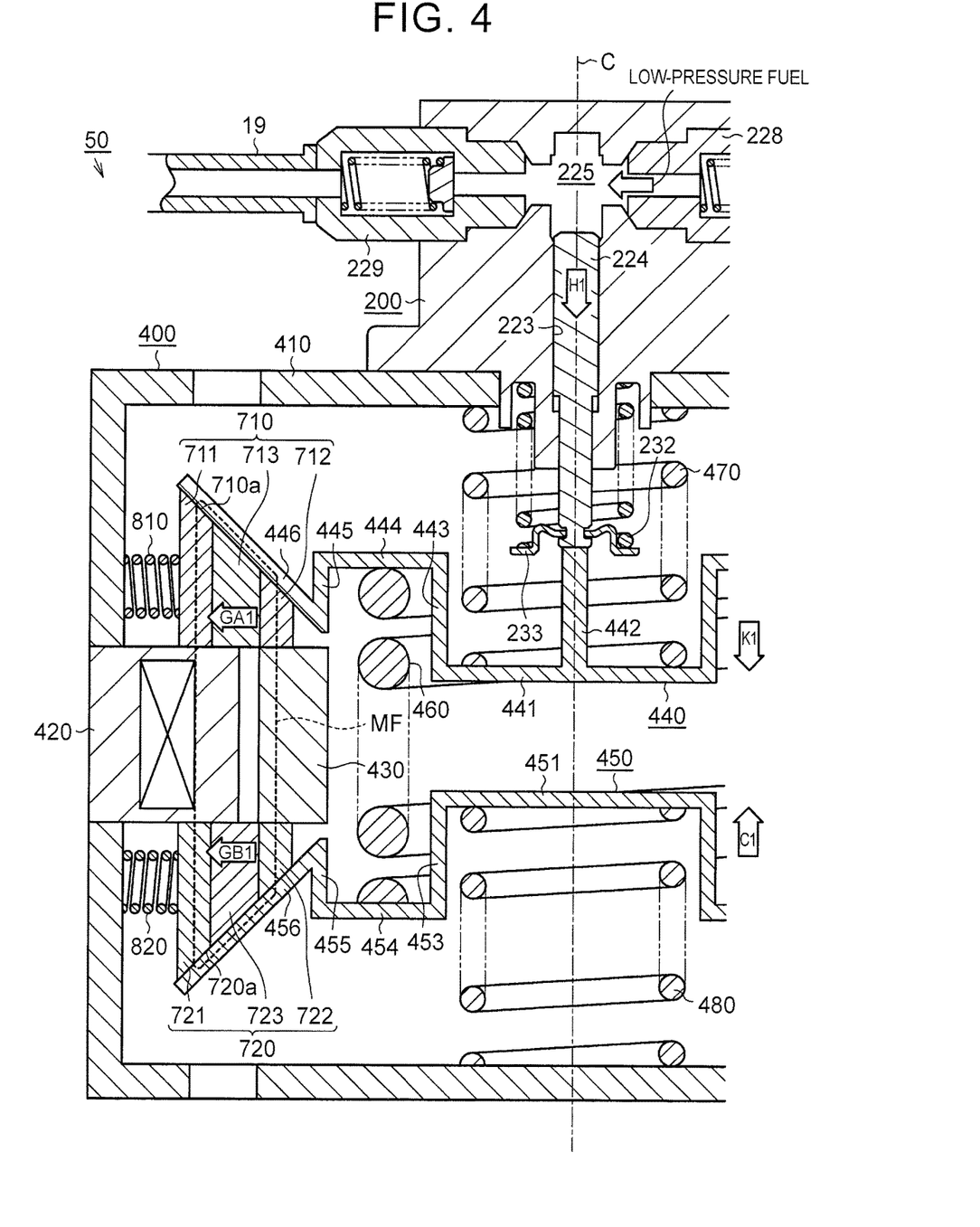
FIG. 4 is a sectional view showing a state of the fuel pump of the embodiment when an electromagnet is energized.

A control device 600 for performing an energization control is connected to the electromagnet 420. As shown in FIG. 4, when the electromagnet 420 is energized, the second magnetic members 710 disposed between the first inclined surface 446 of the first mover 440 and both of the electromagnet 420 and the first magnetic member 430 are magnetized, while the third magnetic members 720 disposed between the second inclined surface 456 of the second mover 450 and both of the electromagnet 420 and the first magnetic member 430 are also magnetized. Therefore, the magnetic flux MF (shown in broken line in FIG. 4) generated by the electromagnet 420 flows annularly through the electromagnet 420, the first magnetic portion 711 of the second magnetic member 710, the first inclined surface 446 of the first mover 440, the second magnetic portion 712 of the second magnetic member 710, the first magnetic member 430, the second magnetic portion 722 of the third magnetic member 720, the second inclined surface 456 of the second mover 450, the first magnetic portion 721 of the third magnetic member 720, and the electromagnet 420. That is, a magnetic circuit is formed by the first inclined surface 446 of the first mover 440, the second inclined surface 456 of the second mover 450, the first magnetic member 430, the second magnetic member 710, the third magnetic member 720, and the electromagnet 420. As a result, the first mover 440 moves in a direction toward the first magnetic member 430 (direction of arrow K1 shown in FIG. 4) and the second mover 450 also moves in a direction toward the first magnetic member 430 (direction of arrow C1 shown in FIG. 4). Accordingly, when the electromagnet 420 is energized, the first mover 440 and the second mover 450 move toward each other.

The first inclined surface 446 of the first mover 440 is attracted to the third inclined surface 710a of the magnetized second magnetic member 710. When the first inclined surface 446 of the first mover 440 and the third inclined surface 710a of the second magnetic member 710 are in the state of being in contact with each other by a magnetic force in this way, in the case where the first mover 440 having the first inclined surface 446 moves in the direction toward the electromagnet 420 and the first magnetic member 430, the second magnetic member 710 moves in a direction away from the central axis C in the radial direction of the plunger 224 (direction of arrow GA1 shown in FIG. 4) due to a component force applied to the third inclined surface 710a. In this way, when the first mover 440 moves in the direction toward the electromagnet 420 and the first magnetic member 430, the second magnetic member 710 maintains the state of being attracted to the first inclined surface 446 of the first mover 440, the electromagnet 420, and the first magnetic member 430 while moving in the radial direction of the plunger 224.

Likewise, the second inclined surface 456 of the second mover 450 is attracted to the fourth inclined surface 720a of the magnetized third magnetic member 720. When the second inclined surface 456 of the second mover 450 and the fourth inclined surface 720a of the third magnetic member 720 are in the state of being in contact with each other by a magnetic force in this way, in the case where the second mover 450 having the second inclined surface 456 moves in the direction toward the electromagnet 420 and the first magnetic member 430, the third magnetic member 720 moves in a direction away from the central axis C in the radial direction of the plunger 224 (direction of arrow GB1 shown in FIG. 4) due to a component force applied to the fourth inclined surface 720a. In this way, when the second mover 450 moves in the direction toward the electromagnet 420 and the first magnetic member 430, the third magnetic member 720 maintains the state of being attracted to the second inclined surface 456 of the second mover 450, the electromagnet 420, and the first magnetic member 430 while moving in the radial direction of the plunger 224.

When the first mover 440 is attracted by the electromagnet 420 and the first magnetic member 430 to move in the direction of arrow K1 as described above, the plunger 224 connected to the connecting portion 442 moves in a direction in which the volume of the pressurizing chamber 225 increases (direction of arrow H1 shown in FIG. 4). Hereinafter, the movement of the plunger 224 in the direction in which the volume of the pressurizing chamber 225 increases is defined as descending of the plunger. When the plunger 224 descends in this way, the pressure in the pressurizing chamber 225 decreases so that the fuel is sucked into the pressurizing chamber 225 through the first check valve 228 from the low-pressure fuel passage 12.

Figure 5:
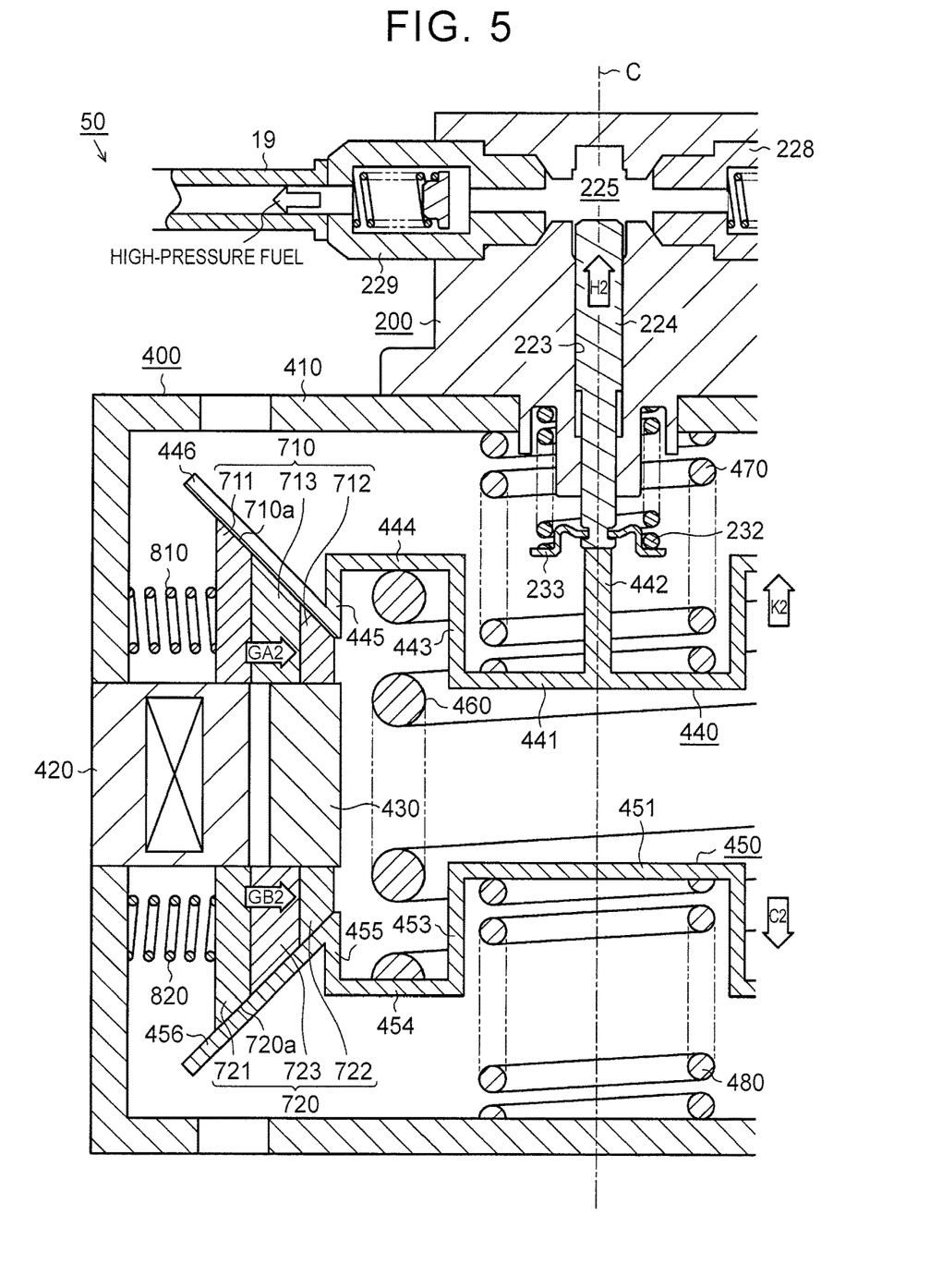
FIG. 5 is a sectional view showing a state of the fuel pump of the embodiment when the energization of the electromagnet is stopped.

As shown in FIG. 5, when the energization of the electromagnet 420 is stopped, the first mover 440 and the second mover 450 move away from each other by the urging force of the first spring 460. That is, the first mover 440 moves in a direction away from the first magnetic member 430 (direction of arrow K2 shown in FIG. 5), while the second mover 450 also moves in a direction away from the first magnetic member 430 (direction of arrow C2 shown in FIG. 5).

When the first mover 440 and the second mover 450 move away from each other by the urging force of the first spring 460, the first inclined surface 446 of the first mover 440 moves in the direction away from the electromagnet 420 and the first magnetic member 430. In this event, by the urging force of the second spring 810, the second magnetic member 710 moves in a direction toward the central axis C in the radial direction of the plunger 224 (direction of arrow GA2 shown in FIG. 5) while the first inclined surface 446 of the first mover 440 and the third inclined surface 710a of the second magnetic member 710 maintain the state of being in contact with each other. In this way, even in the case where the first inclined surface 446 moves in the direction away from the electromagnet 420 and the first magnetic member 430, the second magnetic member 710 maintains the state of being in contact with the first inclined surface 446 of the first mover 440, the electromagnet 420, and the first magnetic member 430 while moving in the radial direction of the plunger 224.

Likewise, when the first mover 440 and the second mover 450 move away from each other by the urging force of the first spring 460, the second inclined surface 456 of the second mover 450 moves in the direction away from the electromagnet 420 and the first magnetic member 430. In this event, by the urging force of the third spring 820, the third magnetic member 720 moves in a direction toward the central axis C in the radial direction of the plunger 224 (direction of arrow GB2 shown in FIG. 5) while the second inclined surface 456 of the second mover 450 and the fourth inclined surface 720a of the third magnetic member 720 maintain the state of being in contact with each other. In this way, even in the case where the second inclined surface 456 moves in the direction away from the electromagnet 420 and the first magnetic member 430, the third magnetic member 720 maintains the state of being in contact with the second inclined surface 456 of the second mover 450, the electromagnet 420, and the first magnetic member 430 while moving in the radial direction of the plunger 224.

When the first mover 440 moves in the direction of arrow K2 as described above, the plunger 224 connected to the connecting portion 442 moves in a direction in which the volume of the pressurizing chamber 225 decreases (direction of arrow H2 shown in FIG. 5). Hereinafter, the movement of the plunger 224 in the direction in which the volume of the pressurizing chamber 225 decreases is defined as ascending of the plunger. When the plunger 224 ascends in this way, the fuel in the pressurizing chamber 225 is pressurized and discharged into the high-pressure fuel passage 19 through the second check valve 229.

The movement of the first mover 440 and the second mover 450 away from each other is stopped at a time point at which the urging force of the first spring 460 that decreases as the first spring 460 extends and the urging forces of the spring 470 and the spring 480 that increase due to compression thereof are balanced. The position of the plunger 224 when the movement of the first mover 440 and the second mover 450 away from each other is stopped, i.e. when the first mover 440 and the second mover 450 are spaced apart from each other to the maximum by the urging force of the first spring 460, is the top dead center of the plunger 224 in the cylinder 223.

The discharge amount of the fuel pump 50 is variably set by changing the stroke amount ST of the plunger 224. That is, the distance SK between the first mover 440 and the electromagnet 420 and the distance SC between the second mover 450 and the electromagnet 420 change according to an energization state of the electromagnet 420. Specifically, the distance SK and the distance SC decrease when the electromagnet 420 is energized, while the distance SK and the distance SC increase when the energization of the electromagnet 420 is stopped. Hereinafter, this change in distance between the mover and the first magnetic member 430 will be referred to as an operation amount of the mover. Assuming that the operation amount is "0" in the state where the first mover 440 and the second mover 450 are spaced apart from each other to the maximum by the urging force of the first spring 460, the operation amount of the first mover 440 becomes "0" when the plunger 224 is at the top dead center. In this case, as the operation amount of the first mover 440 increases, i.e. as the first mover 440 approaches closer to the first magnetic member 430, the stroke amount ST (descending amount) of the plunger 224 from the top dead center increases. Therefore, more fuel is sucked into the pressurizing chamber 225 so that the discharge amount of the fuel pump 50 increases.

Figure 6:
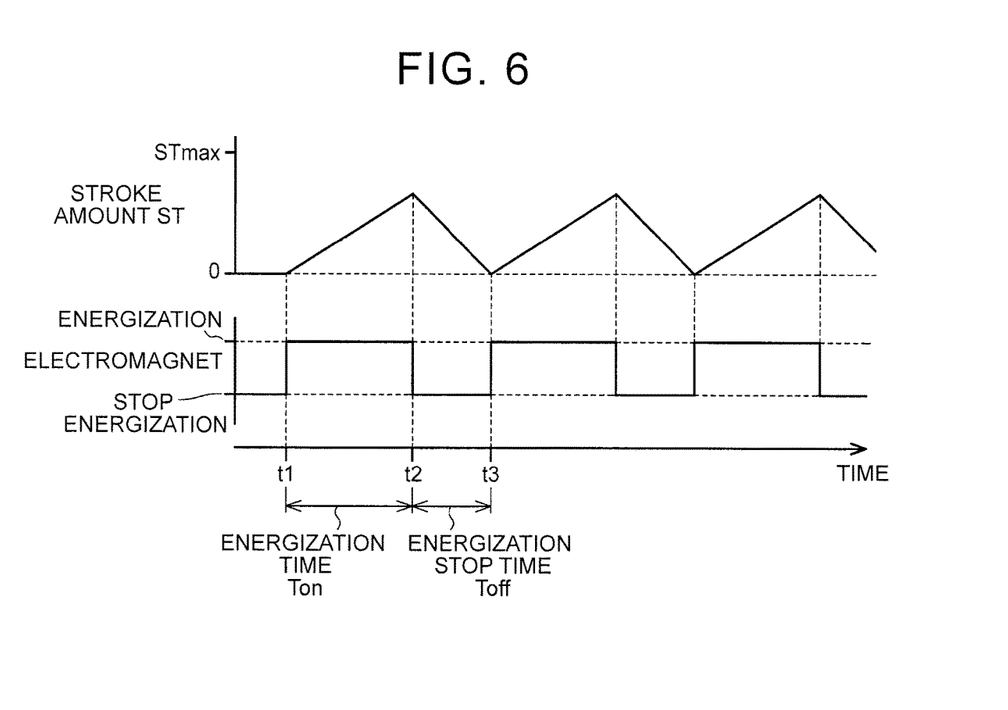
FIG. 6 is a timing chart showing the relationship between an energization state of the electromagnet and a stroke amount of a plunger which are disposed in the fuel pump of the embodiment.

As shown in FIG. 6, when the electromagnet 420 is energized, the first mover 440 approaches the first magnetic member 430 so that the longer an energization time Ton of the electromagnet 420, the greater the stroke amount ST. At a time point at which the first mover 440 approaches and contacts the first magnetic member 430, the stroke amount ST reaches a maximum value STmax.

When the energization of the electromagnet 420 is stopped, the first mover 440 approaching the first magnetic member 430 moves away from the first magnetic member 430 and, after the lapse of a predetermined time from the time point of stopping the energization, the operation amount of the first mover 440 becomes "0" so that the stroke amount ST also becomes "0". The greater the stroke amount ST of the first plunger 224, the longer an energization stop time Toff of the electromagnet 420 that is required for the stroke amount ST to become "0" after the energization of the electromagnet 420 is stopped, and therefore, the energization stop time Toff of the electromagnet 420 can be set based on the energization time Ton of the electromagnet 420.

Accordingly, the control device 600 sets the energization time Ton based on a required discharge amount of the fuel pump 50 such that the greater the required discharge amount, the longer the energization time Ton. Further, the control device 600 sets the energization stop time Toff such that the longer the set energization time Ton, the longer the energization stop time Toff. The control device 600 adjusts the discharge amount of the fuel pump 50 to a desired required discharge amount by alternately repeating the energization of the electromagnet 420 by the energization time Ton and the energization stop of the electromagnet 420 by the energization stop time Toff.

The energization control of the electromagnet 420 described above is only one example for adjusting the stroke amount ST. The stroke amount ST may be changed in another way. Next, the operation of the fuel pump 50 will be described.

As described above, when the electromagnet 420 is energized, since the first mover 440 and the second mover 450 are attracted to the electromagnet 420 and the first magnetic member 430, the first mover 440 and the second mover 450 move toward each other. When the energization of the electromagnet 420 is stopped, the first mover 440 and the second mover 450 move away from each other by the urging force of the first spring 460.

Therefore, by repeating the energization and the energization stop of the electromagnet 420, the plunger 224 connected to the first mover 440 reciprocates, while the second mover 450 serving as a counterweight for the first mover 440 moves synchronously in a direction opposite to a moving direction of the first mover 440. Therefore, vibration that occurs due to the reciprocating movement of the first mover 440 is canceled by vibration that occurs due to the reciprocating movement of the second mover 450.

Further, as described above, when the first inclined surface 446 of the first mover 440 moves in the direction toward the electromagnet 420 and the first magnetic member 430 by the energization of the electromagnet 420, the second magnetic member 710 maintains the state of being attracted to the first inclined surface 446 of the first mover 440, the electromagnet 420, and the first magnetic member 430 while moving in the radial direction of the plunger 224. Therefore, the formation of an air gap between the first mover 440 and the electromagnet 420 and the formation of an air gap between the first mover 440 and the first magnetic member 430 are suppressed during the energization of the electromagnet 420.

Likewise, when the second inclined surface 456 of the second mover 450 moves in the direction toward the electromagnet 420 and the first magnetic member 430 by the energization of the electromagnet 420, the third magnetic member 720 maintains the state of being attracted to the second inclined surface 456 of the second mover 450, the electromagnet 420, and the first magnetic member 430 while moving in the radial direction of the plunger 224. Therefore, the formation of an air gap between the second mover 450 and the electromagnet 420 and the formation of an air gap between the second mover 450 and the first magnetic member 430 are suppressed during the energization of the electromagnet 420.

Further, as described above, when the first inclined surface 446 of the first mover 440 moves in the direction away from the electromagnet 420 and the first magnetic member 430 by stopping the energization of the electromagnet 420, the second magnetic member 710 maintains the state of being in contact with the first inclined surface 446 of the first mover 440, the electromagnet 420, and the first magnetic member 430 while moving in the radial direction of the plunger 224. Therefore, the formation of an air gap between the first mover 440 and the electromagnet 420 and the formation of an air gap between the first mover 440 and the first magnetic member 430 are suppressed when starting the energization of the electromagnet 420 again.

Likewise, when the second inclined surface 456 of the second mover 450 moves in the direction away from the electromagnet 420 and the first magnetic member 430 by stopping the energization of the electromagnet 420, the third magnetic member 720 maintains the state of being in contact with the second inclined surface 456 of the second mover 450, the electromagnet 420, and the first magnetic member 430 while moving in the radial direction of the plunger 224. Therefore, the formation of an air gap between the second mover 450 and the electromagnet 420 and the formation of an air gap between the second mover 450 and the first magnetic member 430 are suppressed when starting the energization of the electromagnet 420 again.

Figure 7:
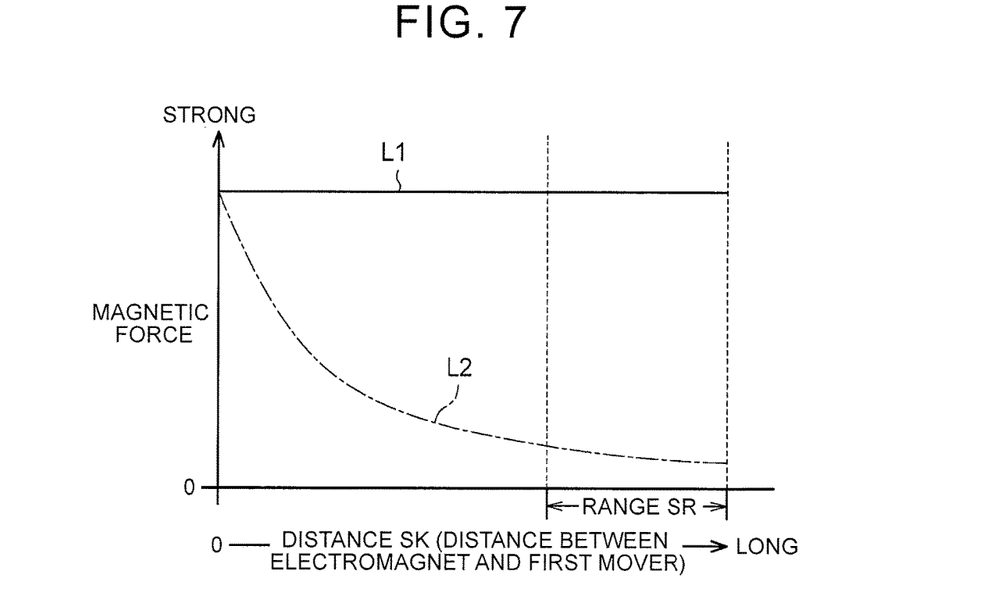
FIG. 7 is a graph showing the relationship between a distance between the electromagnet and a first mover, and a strength of a magnetic force that acts on the first mover.

FIG. 7 shows the relationship between a length of the distance SK and a strength of a magnetic force that acts on the first mover 440. A solid line L1 shown in FIG. 7 indicates the strength of the magnetic force in the fuel pump 50 of this embodiment. A one-dot chain line L2 shown in FIG. 7 indicates a comparative example of the fuel pump 50 of this embodiment. That is, the one-dot chain line L2 indicates the strength of the magnetic force in a fuel pump including neither the second magnetic member 710 nor the third magnetic member 720, wherein an air gap between the electromagnet 420/the first magnetic member 430 and the first mover 440 increases as the first mover 440 moves away from the electromagnet 420 and the first magnetic member 430 (as the plunger 224 ascends).

As indicated by the one-dot chain line L2 in FIG. 7, in the fuel pump including neither the second magnetic member 710 nor the third magnetic member 720, since the air gap between the electromagnet 420/the first magnetic member 430 and the first mover 440 increases as the distance SK increases, the strength of the magnetic force that acts on the first mover 440 decreases in inverse proportion to the square of the distance SK.

Therefore, at the distance SK where the air gap becomes relatively large, more electric power should be supplied to the electromagnet 420 in order to attract the first mover 440 in anticipation of a reduction in magnetic force due to the air gap so that the electric power efficiency is degraded.

In particular, the engine is often used in a low-load range and a medium-load range and, in these load ranges, since the fuel injection amount is relatively small, the operation amount of the first mover 440 becomes small so that there are many chances to use a range where the distance SK becomes relatively long (such as a range SR shown in FIG. 7). Therefore, a state in which the electric power efficiency is degraded tends to occur. Incidentally, in order to make constant the electric power that is supplied to the electromagnet 420, the electric power to be supplied to the electromagnet 420 should be set to be increased in advance in anticipation of a reduction in magnetic force due to an air gap at the distance SK where the air gap becomes relatively large. However, in this case, since the magnetic force becomes excessively strong at the distance SK where the air gap becomes relatively small, the electric power supplied to the electromagnet 420 becomes excessive so that the electric power efficiency is degraded also in this case.

On the other hand, since the fuel pump 50 of this embodiment includes the second magnetic member 710, even if the distance SK changes, the formation of an air gap between the first mover 440 and the electromagnet 420 and the formation of an air gap between the first mover 440 and the first magnetic member 430 are suppressed. Therefore, as indicated by the solid line L1 in FIG. 7, in the fuel pump 50 of this embodiment, even if the distance SK changes, the strength of the magnetic force that acts on the first mover 440 hardly changes so that a magnetic force of a strength approximately equal to that of a magnetic force applied when the first mover 440 is in direct contact with the electromagnet 420 and the first magnetic member 430 is maintained. Therefore, it is not necessary to supply more electric power to the electromagnet 420 in anticipation of a reduction in magnetic force due to an air gap so that the degradation of the electric power efficiency described above is suppressed. Further, since the fuel pump 50 of this embodiment includes also the third magnetic member 720, even if the distance SC changes, the formation of an air gap between the second mover 450 and the electromagnet 420 and the formation of an air gap between the second mover 450 and the first magnetic member 430 are suppressed. Therefore, like the strength of the magnetic force indicated by the solid line L1 in FIG. 7, in the fuel pump 50 of this embodiment, even if the distance SC changes, the strength of the magnetic force that acts on the second mover 450 hardly changes so that a magnetic force of a strength approximately equal to that of a magnetic force applied when the second mover 450 is in direct contact with the electromagnet 420 and the first magnetic member 430 is maintained.

The second magnetic member 710 includes the first magnetic portion 711 that constantly maintains the state of being in contact with the electromagnet 420 when moving in the radial direction of the plunger 224, the second magnetic portion 712 that constantly maintains the state of being in contact with the first magnetic member 430 when moving in the radial direction of the plunger 224, and the non-magnetic portion 713 disposed between the first magnetic portion 711 and the second magnetic portion 712. Further, the third magnetic member 720 includes the first magnetic portion 721 that is the same as the first magnetic portion 711, the second magnetic portion 722 that is the same as the second magnetic portion 712, and the non-magnetic portion 723 that is the same as the non-magnetic portion 713.

As described above, part of the magnetic circuit that attracts the inclined surfaces of the movers, i.e. the first inclined surface 446 and the second inclined surface 456, is formed by the first magnetic portions 711 and 721 and the second magnetic portions 712 and 722. Herein, when the second magnetic member 710 and the third magnetic member 720 move in the radial direction of the plunger 224, the first magnetic portions 711 and 721 are constantly in contact with the electromagnet 420, while the second magnetic portions 712 and 722 are constantly in contact with the first magnetic member 430. Accordingly, even when the second magnetic member 710 and the third magnetic member 720 move in the radial direction of the plunger 224, the magnetic circuit that attracts the inclined surfaces of the movers can maintain a connected state without disconnection. Therefore, it is possible to maintain, for example, a state in which a strong magnetic force is applied to the inclined surfaces of the movers.

As described above, the following effects can be obtained according to this embodiment. (1) It is configured that the first mover 440 connected to the plunger 224 and the second mover 450 serving as the counterweight reciprocate synchronously by the electromagnet 420, the first magnetic member 430, and the first spring 460. Therefore, vibration that occurs due to the reciprocating movement of the first mover 440 can be canceled by vibration that occurs due to the reciprocating movement of the second mover 450.

(2) By providing the second magnetic member 710 and the third magnetic member 720, it is possible to suppress degradation of electric power efficiency due to an air gap. (3) The second magnetic member 710 and the third magnetic member 720 include the first magnetic portions 711 and 721, the second magnetic portions 712 and 722, and the non-magnetic portions 713 and 723. Therefore, even when the second magnetic member 710 and the third magnetic member 720 move in the radial direction of the plunger 224, the magnetic circuit that attracts the first inclined surface 446 and the second inclined surface 456 can maintain a connected state without disconnection.

The embodiment described above can be carried out by changing it as follows. As shown in FIG. 2 and so on, in the above-described embodiment, the inclination direction of the first inclined surface 446 is set such that the first inclined surface 446 is spaced away from the electromagnet 420 as approaching the outer periphery of the first inclined surface 446. Likewise, the inclination direction of the second inclined surface 456 is set such that the second inclined surface 456 is spaced away from the electromagnet 420 as approaching the outer periphery of the second inclined surface 456.

Figure 8:
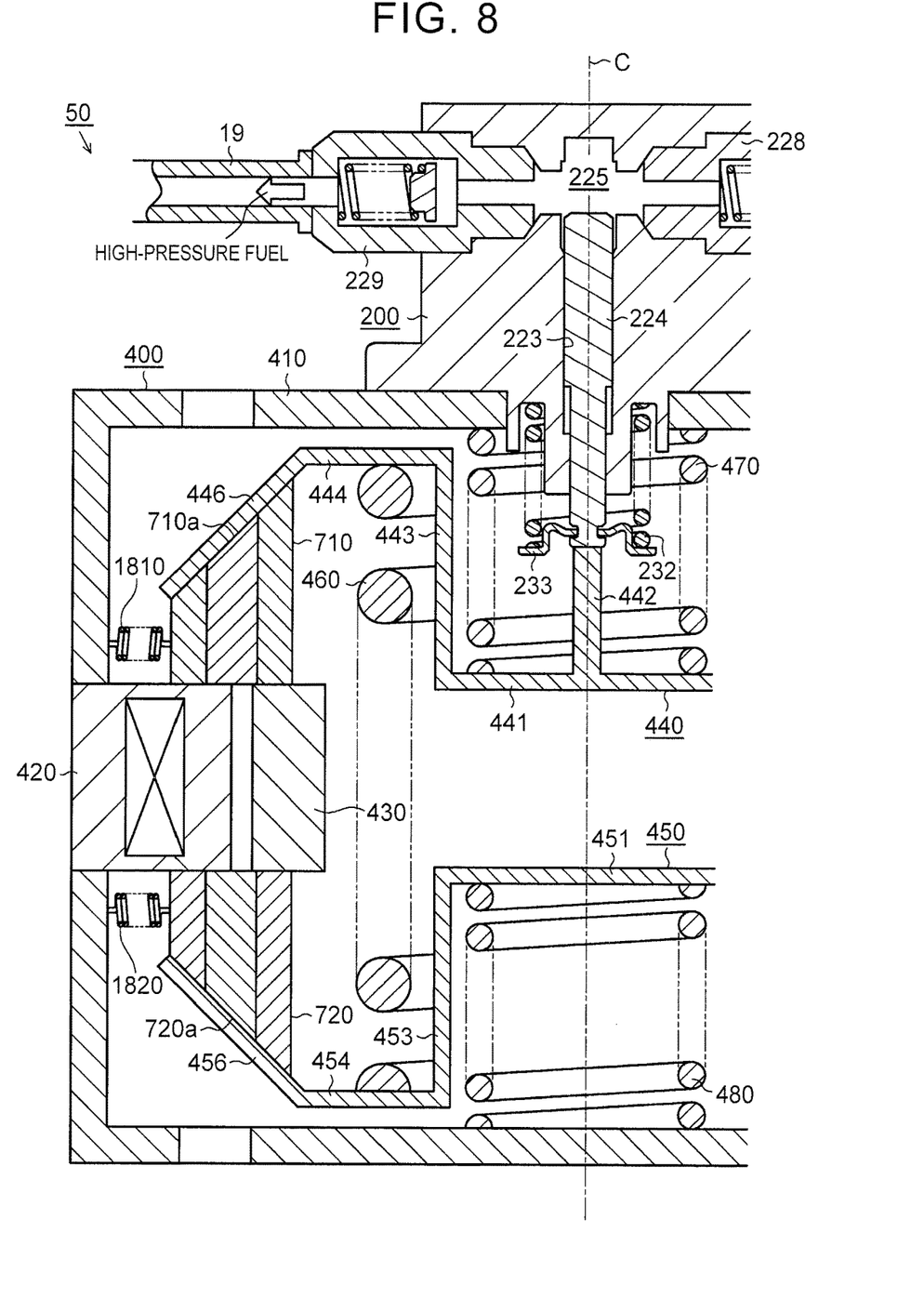
FIG. 8 is a sectional view showing a modification of the fuel pump of the embodiment.

Other than this, as shown in FIG. 8, the inclination direction of a first inclined surface 446 may be set such that the first inclined surface 446 approaches an electromagnet 420 as approaching the outer periphery of the first inclined surface 446, and further, it may be configured that the first inclined surface 446 and a third inclined surface 710a of a second magnetic member 710 in this modification have the same inclination angle and that the first inclined surface 446 and the third inclined surface 710a contact each other. Likewise, the inclination direction of a second inclined surface 456 may be set such that the second inclined surface 456 approaches the electromagnet 420 as approaching the outer periphery of the second inclined surface 456, and further, it may be configured that the second inclined surface 456 and a fourth inclined surface 720a of a third magnetic member 720 in this modification have the same inclination angle and that the second inclined surface 456 and the fourth inclined surface 720a contact each other. Even in this modification, the actions and effects similar to those of the above-described embodiment can be obtained.

In the case of this modification, as the above-described second spring that urges the second magnetic member 710 such that the first inclined surface 446 and the third inclined surface 710a maintain a state of being in contact with each other, it is preferable to provide a spring that urges the second magnetic member 710 in a direction away from a central axis C in a radial direction of a plunger 224. For example, as shown in FIG. 8, it is preferable to dispose a tension spring 1810 between the second magnetic member 710 and an inner wall, facing the second magnetic member 710, of a housing 410. Likewise, as the above-described third spring that urges the third magnetic member 720 such that the second inclined surface 456 and the fourth inclined surface 720a maintain a state of being in contact with each other, it is preferable to provide a spring that urges the third magnetic member 720 in a direction away from the central axis C in the radial direction of the plunger 224. For example, as shown in FIG. 8, it is preferable to dispose a tension spring 1820 between the third magnetic member 720 and an inner wall, facing the third magnetic member 720, of the housing 410.

Another pump portion having the same structure as the pump portion 200 may additionally be provided in the fuel pump 50. Further, a plunger provided in the additional pump portion may be reciprocated by the second mover 450. In this case, the two different pump portions can be driven by the single fuel pump.

Although the stroke amount ST of the plunger 224 is changed in order to variably set the discharge amount of the fuel pump 50, the stroke amount ST may be set to a fixed amount when the discharge amount is not changed.

The shapes of the electromagnet 420, the first magnetic member 430, the second magnetic member 710, the third magnetic member 720, the first mover 440, and the second mover 450 are only by way of example and may be changed as appropriate.

What is claimed is:
1. A fuel pump comprising:
a pump portion including a cylinder, a plunger configured to reciprocate in the cylinder, and a pressurizing chamber defined by the cylinder and the plunger, the pump portion configured to pressurize fuel in the pressurizing chamber by moving the plunger in the cylinder;
a first mover including a first inclined surface extending obliquely in a radial direction of the plunger, the first mover connected to the plunger;
a second mover provided to face the first mover in an axial direction of the plunger, the second mover including a second inclined surface extending obliquely in the radial direction of the plunger and configured to serve as a counterweight for suppressing vibration that occurs due to the reciprocating movement of the first mover;
a housing housing the first mover and the second mover;
an electromagnet provided between the first inclined surface and the second inclined surface;
a first magnetic member provided between the first inclined surface and the second inclined surface, the first magnetic member provided next to the electromagnet in the radial direction of the plunger and fixed to the housing;
a first spring urging the first mover and the second mover such that the first mover and the second mover are spaced away from each other;
a second magnetic member provided between both of the electromagnet and the first magnetic member and the first inclined surface, the second magnetic member including a third inclined surface having an inclination angle equal to an inclination angle of the first inclined surface and configured to contact the first inclined surface, the second magnetic member configured to move in the radial direction of the plunger in a state of being in contact with the electromagnet and the first magnetic member;
a second spring urging the second magnetic member such that the first inclined surface and the third inclined surface maintain a state of being in contact with each other;
a third magnetic member provided between both of the electromagnet and the first magnetic member and the second inclined surface, the third magnetic member including a fourth inclined surface having an inclination angle equal to an inclination angle of the second inclined surface and configured to contact the second inclined surface, the third magnetic member configured to move in the radial direction of the plunger in a state of being in contact with the electromagnet and the first magnetic member; and
a third spring urging the third magnetic member such that the second inclined surface and the fourth inclined surface maintain a state of being in contact with each other.
2. The fuel pump according to claim 1, wherein
the second magnetic member and the third magnetic member each include
a first magnetic portion configured to constantly maintain a state of being in contact with the electromagnet when moving in the radial direction of the plunger,
a second magnetic portion configured to constantly maintain a state of being in contact with the first magnetic member when moving in the radial direction of the plunger, and
a non-magnetic portion disposed between the first magnetic portion and the second magnetic portion.

* * * * *